Aug. 8, 1961 G. ZIMMERMAN 2,995,184
GAS BURNER STRUCTURES
Filed Oct. 1, 1956
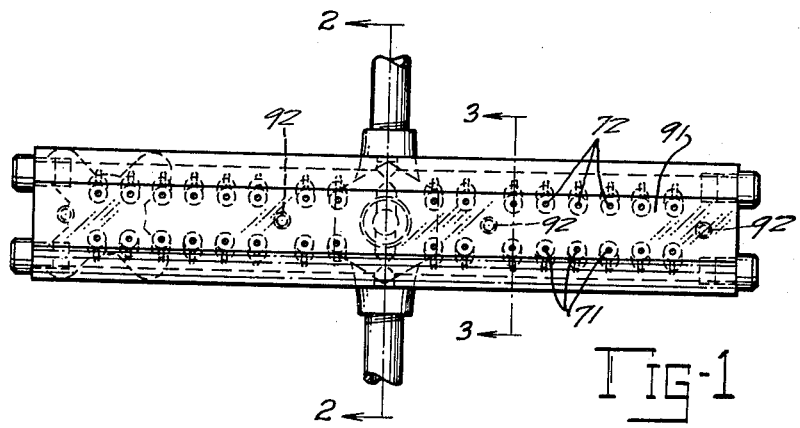
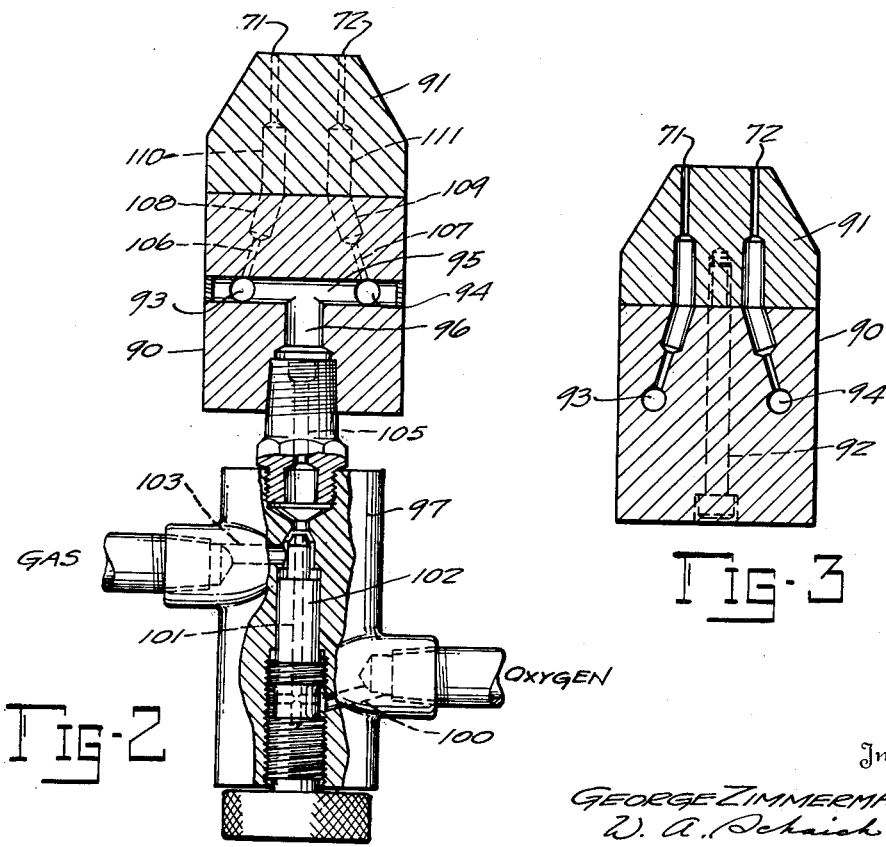
Inventor
GEORGE ZIMMERMAN
W. A. Schaich
By Leonard D. Doubin
Attorneys

United States Patent Office 2,995,184
Patented Aug. 8, 1961

2,995,184
GAS BURNER STRUCTURES
George Zimmerman, Columbus, Ohio, assignor to Owens-Illinois Glass Company, a corporation of Ohio
Filed Oct. 1, 1956, Ser. No. 613,306
2 Claims. (Cl. 158—27.4)

This invention relates to burners for utilizing mixtures of gases such as mixtures of oxygen and natural gas, for use in the heating and fusing of glass parts.

In particular the burners are arranged for use in sealing together the glass parts of cathode or television tubes or glass blocks where it is imperative that the burner flame remain operative even through soft or hard glass particles may momentarily obstruct the exit openings in the exposed burner surface. A high-oxygen-content gaseous mixture in an ordinary burner, where air is excluded, produces a difficult situation because it becomes extremely sensitive to backfiring and back-burning because such ordinary burners operate with an extremely high center flame velocity with a lower piloting type flame adjacent on either side of the center flame.

The main object of the present invention is to provide a burner having a remarkable ability to burn a high oxygen content gaseous mixture with the possibility of backfiring or back-burning eliminated.

Actually, in this present burner it is possible, when using a 3:1 oxygen to natural gas ratio of mixture, and ignited, and with the the burner body approaching the flashback temperature of natural gas, to scrub back and forth over the orifice plate with an ignited wood 2 x 4, and cover the majority of the ports with molten glass or pour water over the orifices without causing back-burning of the burner.

A further object is to provide a highly oxdizing flame wtih low backfire problems.

A still further object is to provide a burner which can be used in the sealing of glass parts and in conjunction with a high voltage electric arc heating method with no loss of stability regarding backfire immunization.

Other objects will be in part apparent and in part pointed out hereinafter.

In the drawings:

FIG. 1 is a plan view of the burner;

FIG. 2 is a sectional elevational view taken at line 2—2 on FIG. 1, showing the entrance passage for the gases and the mixer, and FIG. 3 is a section taken at line 3—3 on FIG. 1 showing the structure of the orifices.

The burner 70 is comprised of a body portion 90 and a burner plate 91 fastened together as by screws 92. A pair of gas conveying channels 93 and 94 are formed in and extend through the length of the burner body and are interconnected by channel 95 into which an inlet opening 96 leads from the gas mixer 97. The mixer 97 is of the usual type in which the oxygen enters at port 100, flows up through opening 101 in adjusting pin 102 and is picked up by and mixed with natural gas from opening 103. The mixed gases then flow through the high velocity opening 105 into the inlet opening 96 and channels 93 and 94, all of which are large enough to permit and form expansion chambers. The mixed gases then flow through a series of high velocity orifices 106 and 107 formed in the burner body 90, then into a series of enlarged openings 108 and 109 also formed in the burner body and individual to each of the series of orifices 106 and 107.

The burner plate 91 is attached to and in alignment with the burner body 90 and has formed therein a series of enlarged openings 110 and 111 which are aligned with and match the like series of openings 108 and 109 in the body 90. These series of enlarged openings 108, 109, 110, and 111 form together expansion chambers individual to each of the high velocity orifices in the series of 106, 107, and 71 and 72.

From the preceding it should be apparent that the gases after being mixed, enter into the burner through at least one high velocity orifice 105 into the combined expansion channels 93, 94, 95, and 96. Then the gases pass through the high velocity openings 106 and 107 into the combined expansion chambers 108, 109, 110, and 111 and to the combustion point through the high velocity openings 71 and 72. Thus, if any one or more of the openings 71 and 72 are closed off the gas expands and is snuffed out in the combined expansion chamber 108 and 110, or 109 and 111.

The backflash or backfire is prevented from proceeding further due to the fact that as it expands in the first expansion chamber 106 and 110, or 107 and 111; the gas entering through ports or openings 106 and 107 is entering at high velocity and thus prevents the expanded back pressure gas from proceeding any further. Larger openings 71 and 72 may be used with this burner structure than can be used with a conventional burner without inducing backfire and because of this ability, more heat becomes available and a glass-to-glass seal can be accomplished in a much shorter time interval. With this availability of more heat, better directivity and control of the application of electrical heating is possible.

Modifications may be resorted to within the spirit and scope of the appended claims.

I claim:

1. An anti-backlash burner structure comprising substantially coextensive elongated solid body and burner plate elements having mating planar faces sealed to one another in substantially longitudinal alignment, means defining a longitudinally extending supply passage for conveying a combustible gas-oxygen mixture, said body element having a plurality of orifices each of which is elongated axially to lie substantially normal to said supply passage and each of which communicates freely with said passage to project toward the one mating face of said body element, said burner plate element also having a plurality of orifices each of which communicates with the atmosphere at the longitudinal face of said burner plate element opposing said mating face thereof and projecting toward the one mating face of said plate element, the number and spacing of said plate orifices corresponding to the number and spacing of said body orifices, at least one of said mating faces having a plurality of recesses therein, each such recess communicating with one of the orifices of the recessed element and with one of the orifices of the other element to establish flow paths between the adjacently located orifices of the two elements, the diameter of the recess being substantially larger than the diameters of the orifices, respectively, and each such recess defining an enlarged expansion chamber having reduced ingress and egress openings defined by the orifices of said elements, respectively, through which the combustible mixture flows at high velocity, whereby any backflash from the burner plate orifices is snuffed out in said expansion chamber.

2. In an anti-backflash burner structure comprising substantially coextensive elongated solid body and burner plate elements having mating planar faces sealed to one another in longitudinal alignment, means defining a longitudinally extending supply passage substantially coextensive with said body element and adapted to reecive a combustible gas-oxygen mixture, said body and plate elements each having a plurality of orifices, each of said body orifices communicating with said supply passage to project toward the one mating face of said body element and each of said burner plate orifices communicating with the atmosphere at the longitudinal face of said burner plate element opposing said mating face thereof, said plate orifices each being aligned with one of said body orifices and joined thereto by radially enlarged chambers defined by a recess cooperatively defined by said elements at the mating faces thereof, the diameters of the chambers being substantially larger than the diameters of the orifices, respectively, and each of the enlarged expansion chambers communicating with the atmosphere and with said supply passage only through the reduced ingress and egress openings defined by the orifices and through which the combustible mixture flows at high velocity, whereby any backflash from the burner plate orifices is snuffed out in said expansion chamber.

References Cited in the file of this patent

UNITED STATES PATENTS

| | | |
|---|---|---|
| 713,421 | Fouche | Nov. 11, 1902 |
| 1,469,392 | Napolitan | Oct. 2, 1923 |
| 1,979,244 | Anderson | Nov. 6, 1934 |
| 2,129,672 | Bucknam | Sept. 13, 1938 |

FOREIGN PATENTS

| | | |
|---|---|---|
| 406,668 | France | Dec. 12, 1909 |
| 303,475 | Italy | Dec. 3, 1932 |